United States Patent
Grootaert et al.

(10) Patent No.: US 6,465,576 B1
(45) Date of Patent: Oct. 15, 2002

(54) FLUOROELASTOMER COMPOSITIONS AND ARTICLES MADE THEREFROM

(75) Inventors: Werner M. A. Grootaert, Oakdale; Robert E. Kolb, Afton, both of MN (US)

(73) Assignee: Dyneon LLC, Oakdale, MN (US)

( * ) Notice: Subject to any disclaimer, the term of this patent is extended or adjusted under 35 U.S.C. 154(b) by 0 days.

(21) Appl. No.: 09/608,367

(22) Filed: Jun. 30, 2000

Related U.S. Application Data

(60) Provisional application No. 60/142,293, filed on Jul. 2, 1999.

(51) Int. Cl.[7] .................................................. C08L 27/22
(52) U.S. Cl. .................... 525/199; 525/200; 525/326.3; 525/340; 525/377; 525/378; 525/387; 526/247; 526/249; 526/310
(58) Field of Search .............................. 526/250, 247, 526/249, 310; 525/199, 200, 377, 387, 340

(56) References Cited

U.S. PATENT DOCUMENTS

| | | | | |
|---|---|---|---|---|
| 3,884,877 A | * | 5/1975 | Kolb | |
| 4,035,565 A | * | 7/1977 | Apotheker | 526/249 |
| 4,233,421 A | | 11/1980 | Worm | 525/343 |
| T107,801 I4 | | 5/1987 | Nersasian | 525/326.3 |
| 4,734,465 A | * | 3/1988 | Moggi | 525/340 |
| 4,758,618 A | | 7/1988 | Ito et al. | 524/430 |
| 4,912,171 A | | 3/1990 | Grootaert et al. | 525/340 |
| 5,041,480 A | | 8/1991 | Kawachi et al. | 524/186 |
| 5,086,123 A | | 2/1992 | Guenthner et al. | 525/276 |
| 5,262,490 A | | 11/1993 | Kolb et al. | 525/343 |
| 5,268,405 A | | 12/1993 | Ojakaar et al. | 524/366 |
| 5,285,002 A | | 2/1994 | Grootaert | 526/222 |
| 5,591,804 A | | 1/1997 | Coggio et al. | 525/276 |
| 6,013,217 A | * | 1/2000 | Hauenstein | 264/169 |
| 6,211,319 B1 | * | 4/2001 | Schmiegel | 526/292 |

FOREIGN PATENT DOCUMENTS

| | | |
|---|---|---|
| DE | 19713806 | 10/1997 |
| EP | 0 661 304 A1 | 7/1995 |
| EP | 0 769 521 A1 | 4/1997 |
| EP | 0 784 064 A1 | 7/1997 |
| WO | 90/14368 | 11/1990 |
| WO | 99/48939 | 9/1999 |

* cited by examiner

*Primary Examiner*—Fred Zitomer
(74) *Attorney, Agent, or Firm*—James V. Lilly; Dean M. Harts

(57) ABSTRACT

A fluoroelastomer composition having improved compression set. The fluoroelastomer composition comprises: (1) a fluoroelastomer containing interpolymerized units of at least one perfluoroolefin, at least one perfluorovinyl ether, and a cure site component capable of participation in a peroxide cure reaction; (2) an additive selected from the group consisting of organo-oniums, phosphates, phosphine oxides, amine oxides, alkyl amines, and heterocyclic amines and salts of heterocyclic amines; (3) a peroxide curative, and (4) optionally a coagent.

19 Claims, No Drawings

FLUOROELASTOMER COMPOSITIONS AND ARTICLES MADE THEREFROM

CROSS REFERENCE TO RELATED APPLICATION

This application claims priority from U.S. Ser. No. 60/142,293 filed Jul. 2, 1999.

FIELD OF THE INVENTION

This invention relates to peroxide-curable fluoroelastomer compositions. In another aspect, the invention relates to articles, including molded articles such as o-rings, seals and gaskets, made from curable fluoroelastomer compositions.

BACKGROUND OF THE INVENTION

Fluoroelastomers (i.e., elastomeric fluoropolymers) are polymeric materials that exhibit significant tolerance to high temperatures and harsh chemical environments. Consequently, fluoroelastomers are particularly well adapted for use as seals and gaskets and other molded elastomeric parts in systems that are exposed to elevated temperatures and/or corrosive chemicals. Such parts are widely used in the chemical processing, semiconductor, aerospace and petroleum industries, among many others.

The unique properties of fluoropolymers are attributable largely to the stability and inertness of the copolymerized fluorinated monomer units that make up the major portion of a polymer backbone. Perfluorinated monomers, such as tetrafluoroethylene, hexafluoropropene, and perfluorovinyl ethers are among such fluorinated monomer units. In order to develop the elastomeric properties of the fluorinated polymers completely, the polymers typically are cross-linked, i.e., they are vulcanized. To accomplish this, a small percentage of a cure site monomer is copolymerized with perfluorinated monomer units. Many cure site monomers are known, including those with at least one bromo or iodo group. Such cure site monomers, when combined with a peroxide and a coagent, will provide a suitably cured composition.

One important property of cured fluoroelastomer compositions is measured as compression set. The compression set of a cured polymer, most often expressed as a percentage, provides an indication of its response to deformation forces. The higher the compression set for the cured elastomer composition, the more it permanently deforms when subjected to compressive forces. Conversely, the lower the compression set for a cured polymer, the more likely the polymer will resist permanent deformation under compressive forces. The lower the compression set of a given cured fluoroelastomer, the more generally useful that elastomer is for most applications.

The presence or absence of various adjuvants in the curable fluoroelastomer composition can affect the resulting compression set of the cured polymer. For example, semiconductor-grade fluoroelastomers typically are formulated without inorganic acid acceptors such as, for example, calcium carbonate, calcium hydroxide and zinc oxide, all of which can leave traces of extractable metallic compounds in the cured composition. Fluoroelastomer compositions formulated without an acid acceptor, however, typically suffer from increased compression set, making them less desirable, and in some cases unacceptable, for some demanding applications.

SUMMARY OF THE INVENTION

The fluoroelastomer compositions of the present invention employ at least one of an organo onium, phosphate, phosphine or amine oxide, alkyl amine, or heterocyclic amine as an additive that provides improved compression set. These additives can be incorporated into a wide range of fluoroelastomer formulations, including those formulated without an acid acceptor. The compositions of this invention find particular utility in molded parts used for semiconductor applications.

In one aspect, the invention provides a curable fluoroelastomer composition comprising:

(1) a fluoroelastomer comprising interpolymerized units derived from (a) at least one perfluoroolefin; (b) at least one perfluorovinyl ether selected from the group consisting of perfluoro(alkyl vinyl) ethers, perfluoro (alkoxy vinyl) ethers, and mixtures thereof; and (c) a cure site component capable of participation in a peroxide cure reaction;

(2) at least one additive selected from the group consisting of organo-oniums, phosphates, phosphine oxides, amine oxides, alkyl amines, and heterocyclic amines and salts of heterocyclic amines;

(3) a peroxide curative; and (4) optionally a coagent.

In another aspect, the invention provides molded articles, including o-rings, gaskets and seals, made from the above curable fluoroelastomer compositions.

DETAILED DESCRIPTION OF PREFERRED EMBODIMENTS

Fluoroelastomers are polymeric compositions generally formed of interpolymerized units of at least two principal monomers. Generally, one of the monomers is a perfluoroolefin and the other is a perfluorovinyl ether, typically either a perfluoro(vinyl alkyl) ether or a perfluoro(vinyl alkoxy) ether. Representative of the perfluoroolefin monomers are tetrafluoroethylene and hexafluoropropene.

Suitable perfluorinated vinyl ethers include those of the formula:

$$CF_2=CFO(R'_fO)_n(R''_fO)_mR_f \qquad (1)$$

where:

$R'_f$ and $R''_f$ are the same or are different linear or branched perfluoroalkylene groups of 2–6 carbon atoms;

m and n are, independently, 0 or an integer from 1 to 10; and $R_f$ is a perfluoroalkyl group of 1–6 carbon atoms.

A preferred class of perfluoro(alkyl vinyl) ethers includes compositions of the formula:

$$CF_2=CFO(CF_2CFXO)_nR_f \qquad (2)$$

where: X is F or $CF_3$; n is 0–5, and $R_f$ is a perfluoroalkyl group of 1–6 carbon atoms.

Most preferred perfluoro(alkyl vinyl) ethers are those where, in reference to either Formula 1 or 2 above, n is 0 or 1 and $R_f$ contains 1–3 carbon atoms. Examples of such perfluorinated ethers include perfluoro(methyl vinyl) ether, perfluoro(ethyl vinyl) ether, and perfluoro(propyl vinyl) ether.

Other useful perfluorinated monomers include those compounds of the formula:

$$CF_2=CFO[(CF_2)_mCF_2CFZO]_nR_f \qquad (3)$$

where $R_f$ is a perfluoroalkyl group having 1–6 carbon atoms, m is 0 or 1, n is 0–5, and Z is F or $CF_3$. Preferred members of this class are those in which $R_f$ is $C_3F_7$, m is 0, and n is 1.

Additional perfluoro(alkyl vinyl) ether monomers useful in the invention include those of the formula:

$$CF_2=CFO[(CF_2CFCF_3O)_n(CF_2CF_2CF_2O)_m(CF_2)_p]C_xF_{2x+1} \quad (4)$$

where m and n each are 0 or an integer from 1–10, p is 0–3, and x is 1–5. Preferred members of this class include compounds where n is 0 or 1, m is 0 or 1, and x is 1.

Perfluoro(alkoxy vinyl) ethers useful in the invention include those of the formula:

$$CF_2=CFOCF_2CF(CF_3)O(CF_2O)_mC_nF_{2n+1} \quad (5)$$

where n is 1–5, preferably 1, and m is 1–3. Specific, representative, examples of useful perfluoro(alkoxy vinyl) ethers include $CF_2=CFOCF_2OCF_2CF_2CF_3$, $CF_2=CFOCF_2OCF_3$, $CF_2=CFO(CF_2)_3OCF_3$, and $CF_2=CFOCF_2CF_2OCF_3$.

Mixtures of perfluoro(alkyl vinyl) ethers and perfluoro (alkoxy vinyl) ethers may also be employed.

Preferred fluorinated copolymers are composed of tetrafluoroethylene and at least one perfluoro(alkyl vinyl) ether as principal monomer units. In such copolymers, the copolymerized perfluorinated ether units constitute from about 15 to about 50 mole percent of total monomer units present in the polymer.

The fluorinated monomers of the invention may be polymerized by methods known in the art. For example, the polymerization process can be carried out by free-radical polymerization of the monomers alone or as solutions, emulsions, or dispersions in an organic solvent or water. Polymerization in an aqueous emulsion or suspension often is preferred because of the rapid and nearly complete conversion of monomers, easy removal of the heat of polymerization, and ready isolation of the polymer. Emulsion or suspension polymerization typically involves polymerizing monomers in an aqueous medium in the presence of an inorganic free-radical initiator system, such as ammonium persulfate or potassium permanganate, and surfactant or suspending agent.

Aqueous emulsion polymerization can be carried out continuously under steady-state conditions in which, for example, monomers, water, surfactants, buffers and catalysts are fed continuously to a stirred reactor under optimum pressure and temperature conditions while the resulting emulsion or suspension is removed continuously. An alternative technique is batch or semibatch polymerization by feeding the ingredients into a stirred reactor and allowing them to react at a set temperature for a specified length of time or by charging ingredients into the reactor and feeding the monomer into the reactor to maintain a constant pressure until a desired amount of polymer is formed.

The free-radical polymerization process can also be carried out in the presence of a perfluorosulfinate and an oxidizing agent to improve the processability of the resulting perfluoroelastomer composition. Such oxidizing agents are water soluble and capable of converting the sulfinate to a sulfonyl moiety. The produced sulfonyl radical is believed to eliminate $SO_2$ and form a fluorinated radical that initiates the polymerization of the ethylenically unsaturated monomers. A number of useful oxidizing agents are known as taught in U.S. Pat. No. 5,285,002. Representative examples of such useful oxidizing agents are sodium, potassium, and ammonium persulfates, perphosphates, perborates, percarbonates, bromates, chlorates and hypochlorites. The amount of oxidizing agent used can vary depending on the particular oxidizing agent and sulfinate employed. Typically an equimolar amount or less (based on the amount of sulfinate) is used.

Perfluorosulfinates useful as oxidizing agents for this purpose include those described in U.S. Pat. No. 5,285,002 and represented by the general formula:

$$R^3_f SO_2 M_{1/x} \quad (6)$$

or $$R^2_f [SO_2 M_{1/x}]_n \quad (7)$$

where:
$R^3_f$ represents a monovalent fluoroaliphatic radical having, for example, from 1 to 20 carbon atoms, preferably 4 to 10 carbon atoms;

$R^2_f$ represents a polyvalent, preferably divalent, fluoroaliphatic radical having, for example, from 1 to 20 carbon atoms, preferably from 2 to 10 carbon atoms;

M represents a hydrogen atom or cation with valence x, which is 1 or 2; and n is 1 to 4, preferably 1 or 2.

The amount of fluoroaliphatic sulfinate employed in the polymerization process can vary, depending, for example, on the molecular weight of polymer desired. Preferably the amount of fluoroaliphatic sulfinate is from 0.01 to 50 mole percent, and most preferably from 0.05 to 10 mole percent, of sulfinate compound based on total quantity of monomers.

In addition to the sulfinate, other reducing agents can be present, such as sodium, potassium or ammonium sulfites, bisulfite, metabisulfite, hyposulfite, thiosulfite, phosphite, sodium or potassium formaldehyde sulfoxylate or hypophosphite. Activators such as ferrous, cuprous, and silver salts, may also be present.

The cure site component employed in the invention is capable of participating in a peroxide cure reaction. The cure site component can be partially or fully fluorinated. It will be understood that when the cure site component is fully fluorinated, the resulting polymer will be perfluorinated, and that when the cure site component is partially fluorinated, the resulting polymer will still be highly fluorinated. Generally, the most useful cure site component will contain one or more iodine or bromine groups, but other functional groups that can participate in the cure reaction, such as nitrile groups, may also be employed. The cure site components can include iodine or bromine-terminated unsaturated monoolefins of 2 to 4 carbon atoms such as bromodifluoroethylene, bromotrifluoroethylene, iodotrifluoroethylene, and 4-bromo-3,3,4,4-tetrafluorobutene-1. Other suitable cure site components include $CF_2=CFOCF_2CF_2Br$, $CF_2=CFOCF_2CF_2CF_2Br$, $CF_2=CFOCF_2CF_2CF_2OCF_2Br$, and bis-olefins such as those disclosed in EPA 0 661 304 A1, EPA 0 784 064 and EPA 0 769 521 A1. Preferably, all or essentially all, of these components are ethylenically unsaturated.

Other useful cure-site components are brominated or iodinated chain transfer agents and initiators. Examples of useful chain transfer agents include perfluoroalkyl bromides or iodides, such as $BrCF_2CF_2Br$, $ICF_2CF_2I$, $BrCF_2CF_2I$ and the like.

Suitable nitrile containing cure site monomers include nitrile-containing fluorinated olefins and nitrile-containing fluorinated vinyl ethers. Such nitrile-containing monomers include the following:

$$CF_2=CFO(CF_2)_nCN \quad (8)$$

$$CF_2=CFO[CF_2CFCF_3O]_pCF_2CF(CF_3)CN \quad (9)$$

$$CF_2=CF[OCF_2CFCF_3]_kO(CF_2)_mCN \quad (10)$$

where, in reference to the above formulas: n=2–12; p=0–4; x=1–2; and m=1–4. An example of such a monomer is perfluoro(8-cyano-5-methyl-3,6-dioxa-1-octene).

Suitable peroxide curatives for use in the invention generally are those which generate free radicals at curing temperatures. Dialkyl peroxide and bis(dialkyl peroxide), each of which decomposes at a temperature above 50° C., are especially preferred. In many cases it is preferred to use a di-tertiarybutyl peroxide having a tertiary carbon atom attached to peroxy oxygen atom. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected form such compounds as dicumyl peroxide, dibenzoyl peroxide, tertiarybutyl perbenzoate, a,a'-bis(t-butylperoxy-diisopropylbenzene), and di[1,3-dimethyl-3-(t-butylperoxy)-butyl]carbonate. Generally, about 1 to 3 parts of peroxide per 100 parts of perfluoroelastomer is used.

Organo onium compounds represent one class of useful additives to the fluoroelastomer compositions of the invention. Suitable organo-onium compounds are known in the art, generally as vulcanization accelerators for fluoroelastomers cured by dihydroxy-containing curing agents. As is known, an organo-onium is the conjugate acid of a suitable Lewis base (e.g. phosphine, amine, ether, and sulfide) and can be formed by reacting said Lewis base with a suitable alkylating agent (e.g., an alkyl halide or acyl halide) resulting in an expansion of the valence of the electron donating atom of the Lewis base and a positive charge on the organo-onium compound. Many of the organo-onium compounds useful in the present invention contain at least one heteroatom, i.e., a non-carbon atom such as N, P, S, O, bonded to organic or inorganic moieties. One particularly useful class of quaternary organo-onium compounds broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many organo-onium compounds suitable for incorporation into the fluoroelastomer compositions of the invention are described and known in the art. See, for example, U.S. Pat. Nos. 4,233,421 (Worm), 4,912,171 (Grootaert et al.), 5,086,123 (Guenthner et al.), and 5,262,490 (Kolb et al.) all of whose descriptions are herein incorporated by reference. Representative examples include the following individually listed compounds and mixtures thereof:

triphenylbenzyl phosphonium chloride
tributylallyl phosphonium chloride
tributylbenzyl ammonium chloride
tetrabutyl ammonium bromide
ammonium perfluorooctanoate
triaryl sulfonium chloride
benzyl tris(dimethylamino) phosphonium chloride
benzyl(diethylamino)diphenylphosphonium chloride Another class of organo-oniums finding utility as additives for the curable fluoroelastomers of the invention are acid-functional oniums represented by Formula 11 below.

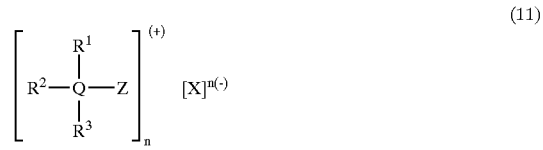

wherein:

Q is a nitrogen, phosphorus, arsenic, or antimony;

Z is a hydrogen atom or is a substituted or unsubstituted, cyclic or acyclic alkyl group having from 4 to about 20 carbon atoms that is terminated with a group of the formula —COOA where A is a hydrogen atom or is a metal cation or Z is a group of the formula $CY_2$—COOR' where Y is a hydrogen or halogen atom, or is a substituted or unsubstituted alkyl or aryl group having from 1 to about 6 carbon atoms that may optionally contain one or more catenary heteroatoms and where R' is a hydrogen atom, a metal cation, an alkyl group, or is an acyclic anhydride, e.g., a group of the formula —COR where R is an alkyl group or is a group that itself contains organo-onium (i.e., giving a bis organo-onium); preferably, R' is hydrogen; Z may also be a substituted or unsubstituted, cyclic or acyclic alkyl group having from 4 to about 20 carbon atoms that is terminated with a group of the formula —COOA where A is a hydrogen atom or is a metal cation;

$R^1$, $R^2$, and $R^3$ are each, independently, a hydrogen atom or an alkyl, aryl, alkenyl, or any combination thereof; each $R^1$, $R^2$, and $R^3$ can be substituted with chlorine, fluorine, bromine, cyano, —OR" or —COOR" where R" is a $C_1$ to $C_{20}$ alkyl, aryl, aralkyl, or alkenyl, and any pair of the $R^1$, $R^2$, and $R^3$ groups can be connected with each other and with Q to form a heterocyclic ring; one or more of the $R^1$, $R^2$, and $R^3$ groups may also be group of the formula Z where Z is as defined above;

X is an organic or inorganic anion (e.g., halide, sulfate, acetate, phosphate, phosphonate, hydroxide, alkoxide, phenoxide, or bisphenoxide); and n is a number equal to the valence of the anion X.

Another class of useful organo-onium compounds include those having one or more pendent fluorinated alkyl groups. Generally, the most useful such fluorinated onium compounds are disclosed by Coggio et al. in U.S. Pat. No. 5,591,804. Representative of this useful class of onium compounds are the following:

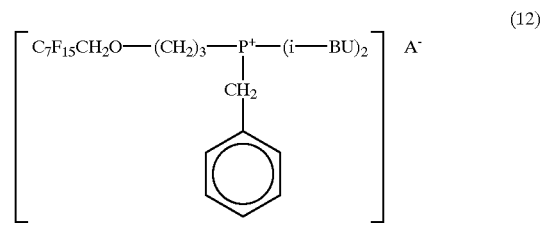

-continued

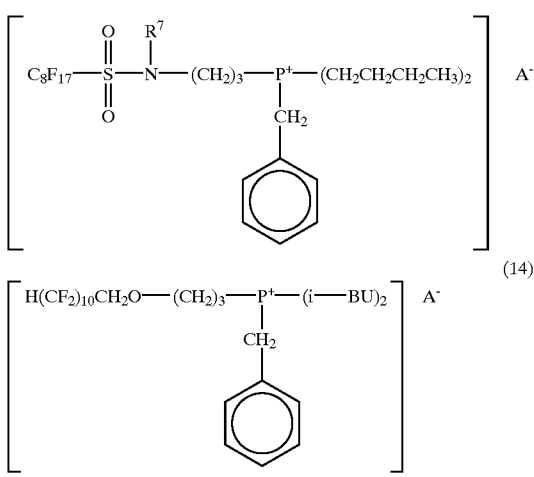

Also useful as additives to the fluorinated elastomeric compositions of the invention are heterocyclic amine compounds including those having two nitrogen atoms, at least one of which is a ring atom. Such compounds may be used in either their salt of free form. Many such compounds are disclosed, for example, in U.S. Defensive Publication T107, 801. A specific class of cyclic amines includes dialkylaminopyridines such as those represented by the formula:

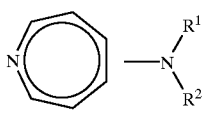

where $R^1$ and $R^2$ are alkyl groups that can be the same or different and independently contain 1 to 5 carbon atoms. The $R^1$ and $R^2$ can, alternatively, be connected together to form a heterocyclic ring with the N-atom to which they are bound. Representative dialkylaminopyridines of Formula 15 above include p-dimethylaminopyridine, dipropylaminopyridine, and 4-pyrrolidinopryidine.

Another useful class of cyclic amines includes diazabicyclo compounds, such as those represented by the formulas:

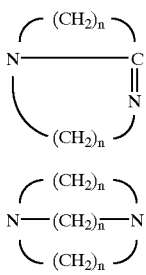

where, in reference to Formulas 16 and 17 above, each subscript is selected independently from one another as an integer of 2 to 8. Representative diazabicyclo compounds of Formula 16 above include 1,4-diazabicyclo[2,2,2]octane and of Formula 17 include 1,5-diazabicyclo[4,3,0]-5-nonene and 1,8-diazabicyclo[5,4,0]-7-undecene. Salts of such compounds may also be used, for example, 8-benzyl-1,8-diazabicyclo[5,4,0]-7-undecenium chloride.

Also useful as additives to the fluorinated elastomeric compositions are phosphates, phosphine oxides, amine oxides, and alkyl amines. These compounds include, for example, alkyl and aryl phosphates, triaryl phosphine oxides, trialkyl phosphine oxides, triaryl amine oxides, trialkyl amine oxides, and trialkyl amines. Such compounds include those of the formula $PR_3O$, $NR_3O$, and $NR_3$ where each R substituent is, independently, a linear or branched alkyl or aryl group having from 1 to about 20 carbon atoms.

The fluorinated elastomeric compositions can include any of the adjuvants commonly employed in curable fluoroelastomer formulations. For example, one material often blended with a fluoroelastomer composition as a part of the curative system is a coagent (sometimes also referred to as a co-curative) composed of a polyunsaturated compound that is capable of cooperating with the peroxide to provide a useful cure. These coagents can generally be added in an amount equal to between 0.1 and 10 parts per hundred parts fluoroelastomer, preferably between 1 and 5 parts per hundred parts fluoroelastomer. Examples of useful coagents include triallyl cyanurate; triallyl isocyanurate; tri (methylallyl isocyanurate; tris(diallylamine)-s-triazine; triallyl phosphite; N,N-diallyl acrylamide; hexaallyl phosphoramide; N,N,N',N'-tetraalkyl tetraphthalamide; N,N,N', N'-tetraallyl malonamide; trivinyl isocyanurate; 2,4,6-trivinyl methyltrisiloxane; and tri(5-norbornene-2-methylene)cyanurate. Particularly useful is triallyl isocyanurate.

Other useful coagents include the bis-olefins disclosed in EPA 0 661 304 A1, EPA 0 784 064 A1 and EPA 0 769 521 A1.

Additives, such as carbon black, stabilizers, plasticizers, lubricants, fillers, and processing aids typically utilized in fluoroelastomer compounding can be incorporated into the compositions of the invention, provided they have adequate stability for the intended service conditions. In particular, low temperature performance can be enhanced by incorporation of perfluoropolyethers. See, for example, U.S. Pat No. 5,268,405.

Carbon black fillers are typically also employed in elastomers as a means to balance modulus, tensile strength, elongation, hardness, abrasion resistance, conductivity, and processability of the compositions. Suitable examples include MT blacks (medium thermal black) designated N-991, N-990, N-908, and N-907, and large particle size furnace blacks. When used, 1–70 phr of large size particle black is generally sufficient.

Fluoropolymer fillers may also be present in the compositions of the invention. Generally, from 1 to 50 parts per hundred fluoroelastomer of a fluoropolymer filler is used. The fluoropolymer filler can be finely divided and easily dispersed as a solid at the highest temperature utilized in fabrication and curing of the fluoroelastomer composition. By solid, it is meant that the filler material, if partially crystalline, will have a crystalline melting temperature above the processing temperature(s) of the fluoroelastomer (s). Such finely divided, easily dispersed fluoroplastics are commonly called micropowders or fluoroadditives. Micropowders are ordinarily partially crystalline polymers.

One or more acid acceptors can also be added to the formulations of the invention, though, where the presence of extractable metallic compounds is undesirable (such as for semiconductor applications) the use of inorganic acid acceptors should be minimized, and preferably avoided altogether. Commonly used acid acceptors include, for example, zinc oxide, calcium hydroxide, calcium carbonate, magnesium oxide, etc. These compounds generally are used in the fluoroelastomer formulation to bind any HF or other acids that might be generated at the high temperatures where fluoroelastomers must function.

The curable compositions of the invention can be prepared by mixing the fluoroelastomer, the peroxide curative, the selected additive or additives, and the other adjuvants, if any, in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. For best results, the temperature of the mixture on the mill typically should not rise above about 120° C. During milling, it is preferable to distribute the components and adjuvants uniformly throughout the gum for effective cure.

The mixture is then processed and shaped, for example, by extrusion (for example, in the shape of a hose or hose lining) or molding (for example, in the form of an O-ring seal). The shaped article can then be heated to cure the gum composition and form a cured elastomer article.

Pressing of the compounded mixture (i.e., press cure) usually is conducted at a temperature between about 95° C. and about 230° C., preferably between about 150° C. and about 205° C., for a period of from 1 minute to 15 hours, typically from 5 minutes to 30 minutes. A pressure of between about 700 kPa and about 20,600 kPa is usually imposed on the compounded mixture in the mold. The molds first may be coated with a release agent and prebaked. The molded vulcanizate is then usually post-cured (e.g., oven-cured) at a temperature usually between about 150° C. and about 275° C., typically at about 232° C., for a period of from about 2 hours to 50 hours or more depending on the cross-sectional thickness of the article. For thick sections, the temperature during the post cure is usually raised gradually from the lower limit of the range to the desired maximum temperature. The maximum temperature used is preferably about 260° C., and is held at this value for about 4 hours or more.

The curable compositions of the invention are useful in production of articles such as gaskets, tubing, and seals. Such articles are produced by molding a compounded formulation of the curable composition with various additives under pressure, curing the part, and then subjecting it to a post cure cycle. The curable compositions formulated without inorganic acid acceptors are particularly well suited for applications such as seals and gaskets for manufacturing semiconductor devices, and in seals for high temperature automotive uses.

Various modifications and alterations of this invention will become apparent to those skilled in the art without departing from the scope and spirit of the present invention, and it should be understood that this invention is not to be unduly limited to the illustrative embodiments set forth hereinabove.

EXAMPLES

Test Method

In the following examples, indicated results were obtained using the following described test method. Compression set was determined by ASTM 395-89 Method B using 0.139 inch (3.5 mm) diameter o-rings compressed for 70 hours at 200° C. Results are reported as a percentage.

Additives Evaluated

Additive A: A 50% solution of triphenyl benzyl phosphonium chloride in methanol.

Additive B: Triphenyl phosphine oxide.

Additive C: Tetrabutyl ammonium chloride.

Additive D: A triaryl sulfonium methoxide prepared by reacting 1.29 millimoles of triarylsulfonium chloride in methanol (prepared according to the method described in U.S. Pat. No. 5,262,490) with 1.29 millimoles of sodium methoxide in methanol (25 wt % NaOCH$_3$ in methanol, available from Aldrich Chemical Co.).

Additive E: Octadecyl amine.

Additive F: Ammonium perfluorooctanoate.

Additive G: Tributyl phosphate.

Additive H: Triphenyl phosphine.

Additive I: Triphenyl amine.

Examples 1–7 and Comparative Examples C-1 to C-3

In Examples 1–7, a fluoroelastomer containing 66.2 mole percent tetrafluoroethylene, 33.7 mole percent perfluoromethyl vinyl ether, and 0.36 weight percent bromine (added as bromotrifluoroethylene) was compounded with an additive according to the invention as indicated in Table 1 below.

TABLE 1

| Example | Additive | Amount (mmhr)* |
|---------|----------|----------------|
| 1 | A | 1.29 |
| 2 | B | 1.29 |
| 3 | C | 1.29 |
| 4 | D | 1.29 |
| 5 | E | 1.29 |
| 6 | F | 1.29 |
| 7 | G | 1.29 |
| C-1 | — | — |
| C-2 | H | 1.29 |
| C-3 | I | 1.29 |

*mmhr expressed as millimoles per hundred grams of rubber.

For each Example and Comparative Example, the fluoroelastomer was compounded with the indicated additive and heated in an oven at 200° C. for 2 hours. After being allowed to cool to room temperature, 100 parts of the fluoroelastomer/additive mixture was compounded with: 15 parts of MT N990 carbon black available from CanCarb of Medicine Hat, Alberta, Canada; 0.75 parts of Varox™ DBPH-50, a peroxide available from R. T. Vanderbilt Co. of Norwalk, Conn.; and 1.5 parts of TAIC (neat) available from Aldrich Chemical Co. of Milwaukee, Wis.

O-rings of the above compounded admixtures were prepared by press curing the compounds for 10 minutes at 177° C., followed subsequently by a 16 hour postcure at 200° C. The resulting o-rings were tested for compression set (70 hours at 200° C., 25% deflection). The results are reported in Table 2 below.

TABLE 2

| Example | Compression Set (%) |
|---------|---------------------|
| 1 | 31.0 |
| 2 | 54.4 |
| 3 | 45.7 |
| 4 | 32.1 |
| 5 | 48.0 |
| 6 | 54.3 |
| 7 | 49.7 |

TABLE 2-continued

| Example | Compression Set (%) |
|---|---|
| C-1 | 71.4 |
| C-2 | 71.7 |
| C-3 | 68.7 |

The above examples show the lower compression set achieved through use of the additives of the invention, compared with no additive or with additives outside the scope of the invention.

Examples 8–9

In Examples 8–9, different levels of Additive A, a 50% solution of a triphenyl benzyl phosphonium chloride in methanol, were evaluated. O-Rings made of a fluoroelastomer were prepared and evaluated as in Example 1 except that for Example 8, 0.5 phr of Additive A was used, and for Example 9, 2.0 phr of Additive A was used. A compression set of 36.2% was obtained for Example 8, and a compression set of 31.4% was obtained for Example 9.

Example 10

In Example 10, a fluoroelastomer composition was prepared and evaluated as in Example 1 except that 1 phr of Additive A was added to the addition of fillers and cure system without prior heating. Under the same conditions of cure and postcure, a compression set of 30.0% was obtained, indicating that heating of the fluoroelastomer with the additive of the invention is not required.

Examples 11–12 and Comparative Examples C-4 and C-5

In Examples 11–12 and Comparative Examples C-4 and C-5, nitrile-containing fluoroelastomer compositions were prepared and evaluated. For each Example and Comparative Example, a copolymer of 64.9 mol % tetrafluoroethylene, 34.6 mol % perfluorovinyl ether, and 0.5 mol % $CF_2=CFOC_5F_{10}CN$ was compounded according to the formulations set forth in Table 3 below.

TABLE 3*

| Example | 11 | C-4 | 12 | C-5 |
|---|---|---|---|---|
| Copolymer | 100 | 100 | 100 | 100 |
| Additive A | 1.5 | — | 1.5 | — |
| N990 Black | 30 | 30 | 30 | 30 |
| ZnO | 5 | 5 | — | — |
| TAIC-DLC[1] | 2.5 | 2.5 | 2.5 | 2.5 |
| Varox ™ DBPH-50[2] | 1.5 | 1.5 | 1.5 | 1.5 |

*All values expressed as parts per hundred rubber (pphr)
[1]Available from Aldrich Chemical Co. as 72% active on diatomaceous earth
[2]Available as 50% active on calcium carbonate O-rings on the above compounded admixtures were prepared and evaluated for compression set as set forth in Example 1, giving the following results:

| Example | Compression Set (%) |
|---|---|
| 11 | 46.6 |
| C-4 | 57.7 |
| 12 | 43.3 |
| C-5 | 74.5 |

We claim:
1. A curable fluoroelastomer composition comprising:
(1) a fluoroelastomer containing interpolymerized units derived from (a) at least one perfluoroolefin; (b) at least one perfluorovinyl ether selected from the group consisting of perfluoro(alkyl vinyl) ethers, perfluoro (alkoxy vinyl) ethers, and mixtures thereof, and (c) a cure site component;
(2) at least one additive selected from acid functional oniums having the formula:

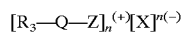

wherein Q is a nitrogen, phosphorus, arsenic, or antimony;
Z is a hydrogen atom or is a substituted or unsubstituted, cyclic or acyclic alkyl group having from 4 to about 20 carbon atoms that is terminated with a group of the formula —COOA where A is a hydrogen atom or is a metal cation or Z is a group of the formula $CY_2$—COOA' where Y is a hydrogen or halogen atom, or is a substituted or unsubstituted alkyl or aryl group having from 1 to about 6 carbon atoms that may optionally contain one or more catenary heteroatoms and where A' is a hydrogen atom, a metal cation, an alkyl group, or is an acyclic anhydride, which itself may contain organo-onium; or Z is a substituted or unsubstituted, cyclic or acyclic alkyl group having from 4 to about 20 carbon atoms that is terminated with a group of the formula —COOA where A is a hydrogen atom or is a metal cation;
each R is, independently, a hydrogen atom or an alkyl, aryl, alkenyl, or any combination thereof; each R can be substituted with chlorine, fluorine, bromine, cyano, —OR" or —COOR" where R" is a $C_1$ to $C_{20}$ alkyl, aryl, aralkyl, or alkenyl, and any pair of the R groups with Q may together form to form a heterocyclic ring; one or more of the R groups may also be group of the formula Z where Z is as defined above;
X is an organic or inorganic anion; and
n is a number equal to the valence of the anion X;
(3) a peroxide curative; and
(4) optionally, a coagent.
2. The curable composition of claim 1 wherein said peroxide curative is selected from the group consisting of 2,5-dimethyl-2,5-di(tertiarybutylperoxy)hexyne-3, 2,5-dimethyl-2,5-di(tertiarybutylperoxy)hexane, dicumyl peroxide, dibenzoyl peroxide, tertiarybutyl perbenzoate, a,a'-bis(t-butylperoxy-diisopropylbenzene), and di[1,3-dimethyl-3-(t-butylperoxy)-butyl]carbonate.
3. A curable fluoroelastomer composition comprising:
(1) a fluoroelastomer containing interpolymerized units derived from (a) at least one perfluoroolefin; (b) at least one perfluorovinyl ether selected from the group consisting of perfluoro(alkyl vinyl) ethers, perfluoro (alkoxy vinyl) ethers, and mixtures thereof; and (c) a cure site component;

(2) from about 0.05 to about 5 parts per hundred of at least one additive selected from the group consisting of phosphoniums, sulfoniums, arsoniums, stiboniums, phosphates, phosphine oxides, amine oxides, compounds of the formula $PR_3O$, $NR_3O$ and $NR_3$ where each R substituent is, independently, a linear or branched alkyl or aryl group having from 1 to about 20 carbon atoms, ammonium vulcanizing accelerators, and heterocyclic amines and salts of heterocyclic amines;

(3) a peroxide curative; and (4) optionally, a coagent.

4. The curable composition of claim 3 wherein said additive is selected from the group consisting of: triphenylbenzyl phosphonium chloride, tributylallyl phosphonium chloride, tributylbenzyl ammonium chloride, tetrabutyl ammonium bromide, ammonium perfluorooctanoate, triaryl sulfonium chloride, benzyl tris(dimethylamino) phosphonium chloride, benzyl(diethylamino)diphenylphosphonium chloride, dialkylaminopyridine, p-dimethylaminopyridine, dipropylaminopyridine, 4-pyrrolidinopryidine, 1,4-diazabicyclo[2,2,2]octane, 1,5-diazabicyclo[4,3,0]-5-nonene, 1,8-diazabicyclo[5,4,0]-7-undecene, and 8-benzyl-1,8-diazabicyclo[5,4,0]-7-undecenium chloride.

5. The curable composition of claim 1 wherein said perfluoro(alkyl vinyl) ether is of the formula:

$$CF_2=CFO(R'_fO)_n(R''_fO)_mR_f$$

where:

R'$_f$ and R''$_f$ are the same or are different linear or branched perfluoroalkylene groups of 2–6 carbon atoms;

m and n are, independently, 0 or an integer from 1 to 10; and

R$_f$ is a perfluoroalkyl group of 1–6 carbon atoms.

6. The curable composition of claim 1 wherein said perfluoro(alkyl vinyl) ether is of the formula:

$$CF_2=CFO(CF_2CFXO)_nR_f$$

$$CF_2=CFO[(CF_2)_mCF_2CFZO]_nR_f$$

where n is 0–5; m is 0 or 1; X is F or $CF_3$; Z is F or $CF_3$; and R$_f$ is a perfluoroalkyl group of 1–6 carbon atoms;

$$CF_2=CFO[(CF_2CFCF_3O)_n(CF_2CF_2CF_2O)_m(CF_2)_p]C_xF_{2x+1}$$

where m and n each are 0 or an integer from 1–10, p is 0–3, and x is 1–5; or $$CF_2=CFOCF_2CF(CF_3)O(CF_2O)_mC_nF_{2n+1}$$

where n is 1–5, preferably 1, and m is 1–3.

7. The curable composition of claim 1 wherein said perfluoroolefin is tetrafluoroethylene or hexafluoropropene and wherein said perfluorovinyl ether is selected from the group consisting of: perfluoro(methyl vinyl) ether, perfluoro(ethyl vinyl) ether, perfluoro(propyl vinyl) ether, $CF_2=CFOCF_2OCF_2CF_2OCF_3$, $CF_2=CFOCF_2CF_3$, $CF_2=CFO(CF_2)_3OCF_3$, and $CF_2=CFOCF_2CF_2OCF_3$.

8. The curable composition of claim 1 wherein said cure site component is an iodine or bromine-containing unsaturated monoolefin.

9. The curable composition of claim 1 wherein said cure site component is a nitrile-containing monomer of the formula:

$$CF_2=CFO(CF_2)_nCN$$

$$CF_2=CFO[CF_2CFCF_3O]_pCF_2CF(CF_3)CN$$

or $$CF_2=CF[OCF_2CFCF_3]_kO(CF_2)_mCN$$

where n=2–12; p=0–4; x=1–2; and m=1–4.

10. The curable composition of claim 1 wherein said cure site component is selected from the group consisting of bromodifluoroethylene, bromotrifluoroethylene, iodotrifluoroethylene, 4-bromo-3,3,4,4-tetrafluorobutene-1, $CF_2=CFOCF_2CF_2Br$, $CF_2=CFOCF_2CF_2CF_2Br$, $CF_2=CFOCF_2CF_2CF_2OCF_2CF_2Br$, and perfluoro(8-cyano-5-methyl-3,6dioxa-1-octene).

11. The curable composition of claim 1 wherein said peroxide curative is a dialkyl peroxide or bis(dialkyl peroxide).

12. The curable composition of claim 3 wherein said peroxide curative is selected from the group consisting of 2,5-dimethyl-2,5di(tertiarybutylperoxy)hexyne-3,2,5-dimethyl-2,5-di(tertiarybutylperoxy)hexane, dicumyl peroxide, dibenzoyl peroxide, tertiarybutyl perbenzoate, a,a'-bis(t-butylperoxy-diisopropylbenzene), and di[1,3-dimethyl-3-(t-butylperoxy)-butyl]carbonate.

13. The curable composition of claim 1 wherein said additive is an organo-onium selected from the group consisting of: triphenylbenzyl phosphonium chloride, tributylallyl phosphonium chloride, tributylbenzyl ammonium chloride, tetrabutyl ammonium bromide ammonium perfluorooctanoate, triaryl sulfonium chloride, benzyl tris (dimethylamino) phosphonium chloride, and benzyl (diethylamino)diphenylphosphonium chloride.

14. The curable composition of claim 1 wherein at least one of said additives is an acid-functional organo-onium.

15. The curable composition of claim 1 wherein at least one of said additives is an organo-onium compound having one or more pendant fluorinated alkyl groups.

16. The curable composition of claim 1 wherein at least one of said additives is a dialkylaminopyridine.

17. The curable composition of claim 1 wherein at least one of said additives is a diazabicyclo compound or a salt of a diazabicyclo compound.

18. The curable composition of claim 1 wherein at least one of said additives is selected from the group consisting of, p-dimethylaminopyridine, dipropylaminopyridine, 4-pyrrolidinopryidine, 1,4-diazabicyclo[2,2,2]octane, 1,5-diazabicyclo[4,3,0]-5-nonene, 1,8-diazabicyclo[5,4,0]-7-undecene, and 8-benzyl-1,8-diazabicyclo[5,4,0]-7-undecenium chloride.

19. The curable composition of claim 1 wherein at least one of said additives is a phosphine oxide, amine oxide, or compound of the formula $PR_3O$, $NR_3O$, or $NR_3$ where each R substituent is, independently, a linear or branched alkyl or aryl group having from 1 to about 10 carbon atoms.

* * * * *